United States Patent [19]
Griffin

[11] Patent Number: 5,520,300
[45] Date of Patent: May 28, 1996

[54] LOCKABLE PRESSURE RELIEF FUEL CAP

[75] Inventor: Jeffery Griffin, Connersville, Ind.

[73] Assignee: Stant Manufacturing Inc., Connersville, Ind.

[21] Appl. No.: 138,394

[22] Filed: Oct. 18, 1993

[51] Int. Cl.⁶ .................................................. B65D 55/14
[52] U.S. Cl. ................... 220/210; 220/DIG. 33
[58] Field of Search ................... 220/203, 204, 220/206, 86.2, 210, DIG. 33

[56] References Cited

U.S. PATENT DOCUMENTS

| | | | |
|---|---|---|---|
| 3,945,454 | 3/1976 | Kinoshita | 220/210 |
| 3,998,078 | 12/1976 | Detwiler | 220/210 |
| 4,000,632 | 1/1977 | Summan . | |
| 4,000,633 | 1/1977 | Evans | 220/210 |
| 4,013,191 | 3/1977 | Gerdes | 220/210 |
| 4,083,209 | 4/1978 | Sloan, Jr. . | |
| 4,164,302 | 8/1979 | Gerdes | 220/210 |
| 4,280,347 | 7/1981 | Evans . | |
| 4,299,102 | 11/1981 | Aro | 220/DIG. 33 |
| 4,342,208 | 8/1982 | Evans . | |
| 4,453,388 | 1/1984 | Baker | 220/210 |
| 4,485,647 | 12/1984 | Matthews | 220/210 |
| 4,527,406 | 7/1985 | Baker | 220/210 |
| 4,579,244 | 4/1986 | Fukuta | 220/DIG. 33 |
| 4,676,390 | 6/1987 | Harris . | |
| 4,830,058 | 5/1989 | Harris . | |
| 4,887,733 | 12/1989 | Harris . | |
| 5,000,339 | 3/1991 | Wheat | 220/DIG. 33 |
| 5,108,001 | 4/1992 | Harris . | |
| 5,110,003 | 5/1992 | MacWiliams . | |
| 5,183,173 | 2/1993 | Heckman | 220/DIG. 33 |

Primary Examiner—David Scherbel
Assistant Examiner—Randall E. Chin
Attorney, Agent, or Firm—Barnes & Thornburg

[57] ABSTRACT

A lockable pressure-release fuel cap is provided to close a filler neck. An actuation system within the fuel cap is operable to enable a user to vent fuel vapor pressure in the filler neck in response to rotation of a key in a lock unit included in the fuel cap prior to removal of the fuel cap from the filler neck.

43 Claims, 5 Drawing Sheets

LOCKABLE PRESSURE RELIEF FUEL CAP

BACKGROUND AND SUMMARY OF THE INVENTION

The present invention relates to fuel caps for closing filler necks of vehicle fuel tanks, and particularly to locking fuel caps. More particularly, the present invention relates to locking fuel caps that enable fuel vapor to vent from the tank upon movement of a lock to an unlocked position prior to rotation of the fuel cap in a removing direction.

Conventional fuel caps for closing the filler neck of vehicle fuel tanks generally include a pressure-vacuum vent valve located in the cap to control the pressure within the fuel tank. Whenever the pressure within the tank reaches a predetermined superatmospheric level, the pressure valve portion of the pressure-vacuum vent valve automatically opens to prevent excess pressure build-up. Whenever the pressure within the tank drops to a predetermined subatmospheric level, the vacuum valve portion of the pressure-vacuum vent valve opens to equalize the pressure in the tank. The pressure-vacuum vent valve, in a conventional fuel cap, must be adjusted so that the potential for some vapor pressure to remain in the fuel tank exists at all times. Generally, the pressure maintained within the fuel tank is in the range of 1–2 PSI.

The retention of some level of fuel vapor in the tank is desired for several reasons and normally does not create any problems. However, under certain conditions, pressure from fuel vapor can result in fuel and fuel vapors escaping from the filler neck during removal of the fuel cap. A rapid escape, or surge, of the fuel and fuel vapor from the filler neck after the cap removal can result in emission of fuel vapor in the region surrounding the filler neck.

With larger fuel tanks now being utilized in many vehicles, and particularly with the use of newer, more volatile fuels having higher than normal Reid vapor pressure may be generated in these fuel tanks, particularly in warm or hot weather or after the vehicle has been running for awhile. Therefore, it would be advantageous to provide a fuel cap that allows fuel vapor to be vented from the fuel tank some time during the cap removal operation, but before the cap is actually removed from the filler neck.

Threaded caps that engage threads in the filler neck of vehicles are now widely used because of their ease of installation and removal and because of the excellent sealing characteristics. Most conventional threaded fuel caps include a primary seal that is adapted to engage a sealing lip on the filler neck when the cap is rotated fully in the cap-installing direction. Because unseating of the primary seal can result in a surge of fuel and fuel vapor from the filler neck in warm or hot weather, or after the vehicle has been running for awhile, it would be advantageous to provide a fuel cap that enables fuel vapor to be vented from the tank in a controlled manner before the seal between the primary seal and the filler neck is broken.

Locking gas caps are, of course, very old in the art. Current conventional locking gas caps typically include a threaded closure member and an outer shell with key-lock means for selectively providing a driving connection between the outer shell and the closure member. In such devices, until the key is actuated, the outer shell will simply rotate on the closure member and not disengage the closure member from the filler neck.

Conventional locking fuel caps also incorporate a torque-override feature. See, for example, U.S. Pat. No. 4,342,208 to Evans. The torque-override feature prevents the closure member of the cap from being twisted too tightly on the filler neck, thereby damaging the threads or the gasket which provides a seal between the filler neck and the closure member. The torque-override feature also prevents installing the cap so tightly as to make it difficult to remove from the filler neck.

In conventional locking fuel caps, the key/lock combination controls the driving connection between the outer shell and the closure member, but has no effect on the venting capabilities of the fuel cap. If the fuel cap is to be vented, it must be vented by other means such as breaking the primary seal by partially removing the closure member from the filler neck. A locking fuel cap that enables fuel vapor to be vented from the tank in a controlled manner by merely rotating a key to an unlocked position without breaking the primary seal would provide a substantial improvement over conventional locking gas caps.

According to the present invention, a lockable fuel cap comprises closure means for rotatably engaging the filler neck and shell means for providing a hand grip for rotating the fuel cap relative to the filler neck between a removed position and an installed position. Lock means is coupled to the shell means for selectively locking and unlocking the fuel cap and is movable between a locked position and an unlocked position. The lockable fuel cap also includes vent means for equalizing fuel vapor pressure between the filler neck and the atmosphere through the closure means and means for actuating the vent means in response to movement of the lock means from the locked position to the unlocked position.

In preferred embodiments, the lock means includes a lock cylinder housing for connecting a conventional lock cylinder to the shell means. A plunger and a removal hub cooperate with the lock means to provide a driving connection between the shell means and the closure means for removing the fuel cap. The plunger is coupled to the lock cylinder housing for axial movement relative thereto. The plunger is configured to include drive means for engaging the removal hub which is rotationally locked to the closure means. Rotation of a key turns the lock cylinder to an unlocked position, causing throw members on the lock cylinder to engage ramp surfaces formed on the plunger to drive the plunger into engagement with the removal hub. At the same time, fingers formed on the plunger disengage from the lock cylinder housing and position themselves to maintain the plunger in engagement with the removal hub, even if the key is moved to the locked position. Thus, when the key is turned to the unlocked position, a driving connection is established between the shell means and the closure means which is maintained when the key is returned to the locked position.

A torque-override mechanism is illustratively included in the lockable fuel cap and includes a race and a drive hub. The drive hub is rotationally locked to the shell means and includes a plurality of drive members. Each drive member has a pawl tooth positioned to engage a radially-inwardly projecting lug formed on the race. The pawl teeth are configured with drive faces to engage the radially-inwardly facing lugs during movement of the fuel cap in the cap-installing direction. The pawl teeth further include ramped surfaces which cooperate with flexible arms of the drive members to ratchet past the radially-inwardly facing lugs when the fuel cap is moved in the cap-removing direction. Thus, the drive hub and race cooperate to provide a driving connection between the shell means and the closure only when the cap is moved in the cap-installing direction.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

A lockable pressure-release fuel cap 10 for closing a threaded filler neck 12 of a vehicle or other fuel system is illustrated in FIGS. 1–5. An actuation system within the fuel cap 10 enables fuel vapor pressure in the filler neck 12 to be vented in response to rotation of a key in a conventional lock cylinder prior to removal of the fuel cap 10 from the filler neck 12.

Figure 1:
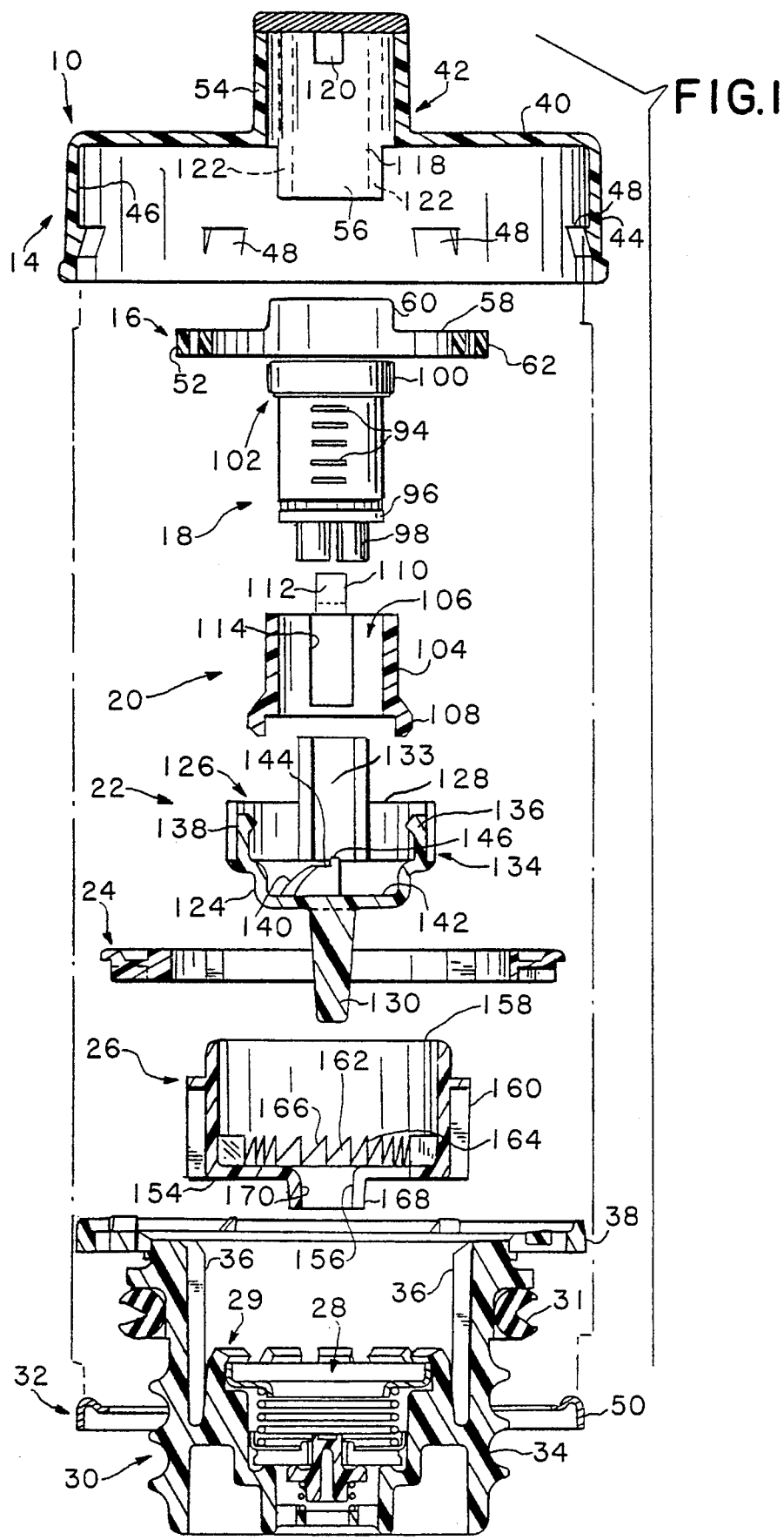
FIG. 1 is an exploded, partial sectional view of an improved locking fuel cap in accordance with the present invention incorporating a pressure-relief function actuatable by movement of a lock to an unlocked position.

Referring to FIG. 1, fuel cap 10 includes a shell 14, a drive hub 16, a lock cylinder 18, a lock cylinder housing 20, a plunger 22, a race 24, a removal hub 26, a pressure-vacuum vent valve assembly 28, an externally threaded closure 30, and a retainer 32.

Figure 2:
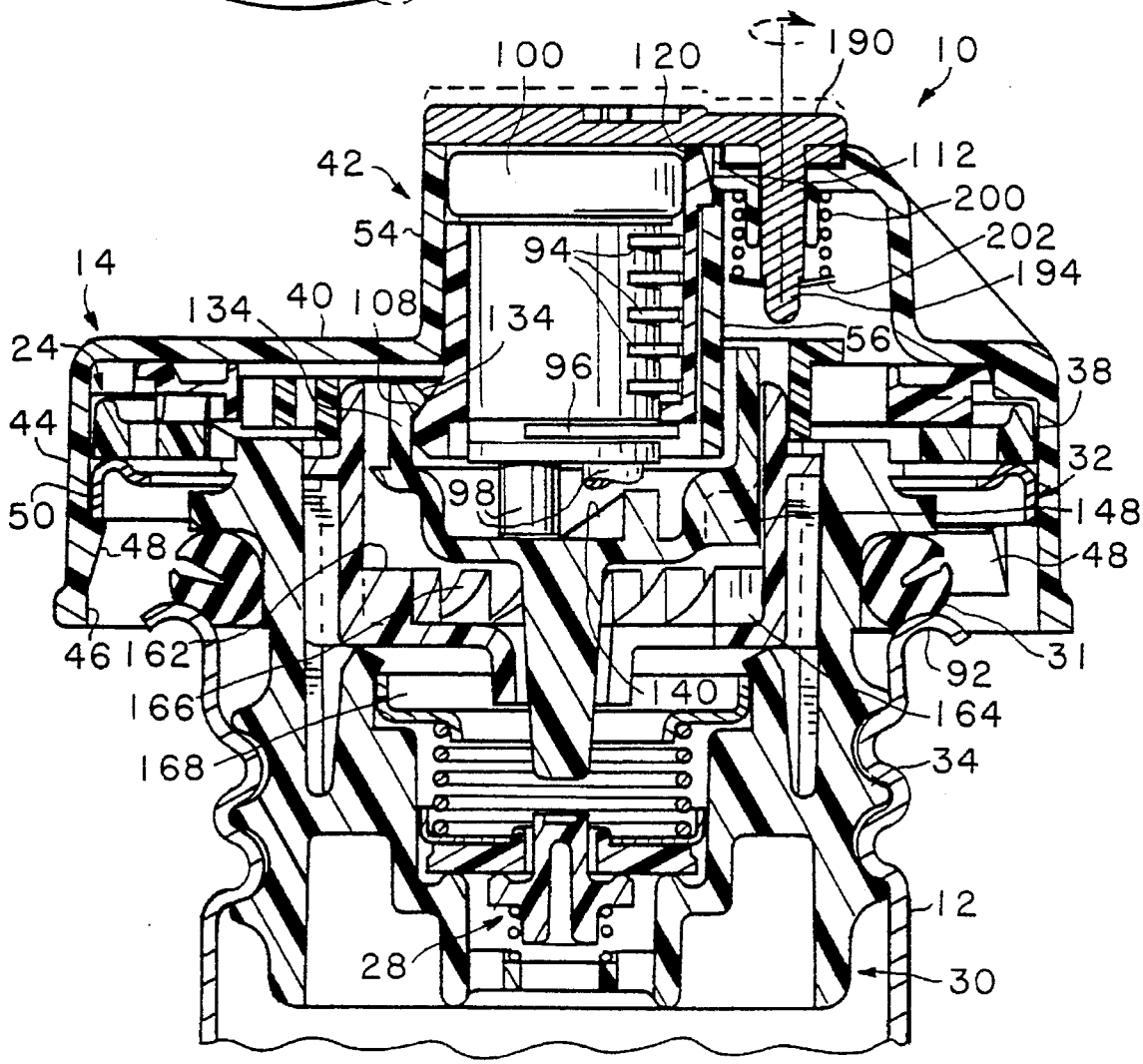
FIG. 2 is a sectional view taken along line 2—2 of FIG. 3 showing the fuel cap engaged with the filler neck of a fuel tank and the lock moved to its locked position.
Figure 4:
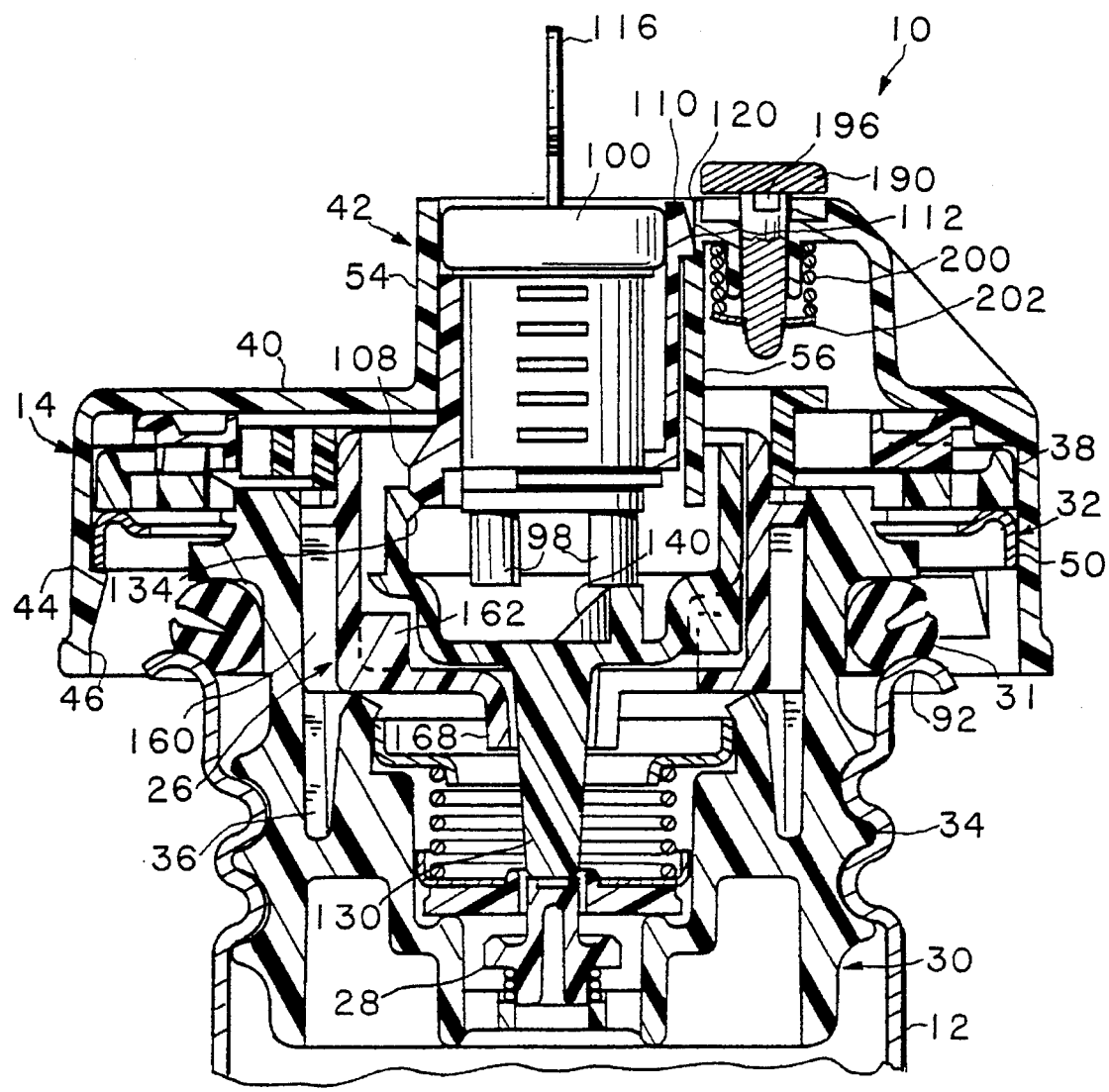
FIG. 4 is a sectional view taken along line 4—4 of FIG. 5 following movement of the lock to its unlocked position to actuate the pressure-vacuum vent valve and vent pressurized fuel vapor from the filler neck through the fuel cap.

In an assembled fuel cap 10, as seen in FIGS. 2 and 4, the pressure-vacuum vent valve assembly 28 is positioned in the closure 30 and the removal hub 26 is located in the closure 30 above the valve assembly 28 for rotational movement with the closure 30. The drive hub 16 is positioned on, and rotates about, the removal hub 26. The race 24 sits on a flange 38 formed on the closure 30, and is ultimately situated between the shell 14 and the flange 38.

The lock cylinder 18 is inserted for rotation inside the lock cylinder housing 20 which, in turn, is attached to the shell 14. The plunger 22 is coupled to the lock cylinder housing 20 for axial movement relative thereto. The shell 14, with the lock cylinder 18, lock cylinder housing 20 and plunger 22, is positioned over the closure 30 to enclose the flange 38 and race 24. The sides of the shell 14 extend past the flange 38 to engage the retainer 32 to hold the assembly together as shown best in FIG. 2.

Illustratively, the retainer 32 is a steel ring that functions to retain shell 14 on closure 30 and to reinforce and strengthen the plastic shell 14 against deformation during attack. By using a sturdy steel retainer ring 32, a person seeking to remove the fuel cap 10 without actuating lock cylinder 18 will be thwarted because that person will be unable to squeeze or deform the plastic shell 14 easily in an effort to cause the shell 14 to disengage from the cap assembly. The retainer 32 is positioned to lie inside the shell 14, outside and around closure 30, and under race 24 as shown in FIG. 2.

The various components of the fuel cap 10 cooperate to establish and disable separate driving connections for cap removal and installation and actuate the pressure-vacuum vent valve assembly 28 to equalize the pressure between the fuel tank (not shown) and the atmosphere. Advantageously, the actuation of the pressure-vacuum vent valve assembly 28 occurs simultaneously with the establishment of the cap-removing driving connection and does not require rotation of the fuel cap 10 in the cap-removing direction.

Generally, two separate driving connections permit installation and removal of the fuel cap 10 from the filler neck 12. In a first, cap-removing driving connection, the shell 14 is coupled to the lock cylinder housing 20. The lock cylinder housing 20 is coupled to the plunger 22 so that the plunger 22 moves axially relative to the shell 14 and the lock cylinder housing 20. The removal hub 26 is coupled to the closure 30 for rotational movement with the closure 30. In a fashion to be described later, movement of a key 116 (FIG. 4) to move the lock cylinder 18 to an unlocked position moves the plunger 22 into engagement with the removal hub 26 to establish the cap-removing driving connection and simultaneously actuates the pressure-vacuum vent valve assembly 28 to equalize pressure between the tank (not shown) and the atmosphere.

The plunger 22 and removal hub 26 also cooperate to form a mechanism for disengaging the plunger 22 from the removal hub 26 and disabling the cap-installing driving connection in response to movement of the plunger 22 in a cap-removing direction relative to the removal hub 26. Thus, the cap-removing driving connection is uni-directional and plays no role in rotating the closure 30 in the cap-installing direction.

In a second, cap-installing driving connection, the drive hub 16 is coupled to the shell 14, and the race 24 is positioned to engage the closure 30. Rotation of the shell 14 in the cap-installing direction rotates the drive hub 16, which engages the race 24. The race 24 engages the closure 30, thereby establishing a cap-installing driving connection between the shell 14 and the closure 30.

Rotation of the shell 14 in the cap-installing direction rotates the closure 30 until the closure 30 properly seals the filler neck 12 (FIGS. 2 and 4). Continued movement of the shell 14 in the cap-installing direction after the closure 30 seals the filler neck 12 actuates a torque-override feature to prevent the closure 30 from being twisted too tightly on the filler neck 12 and simultaneously provides the relative movement between the plunger 22 and the removal hub 26 necessary to disengage the plunger 22 from the removal hub 26. Thus, movement of the shell 14 relative to the closure 30 simultaneously actuates the torque-override feature and disables the cap-removing driving connection.

As will be described later, the mechanism used on the drive hub 16 for engaging the race 24 is designed to allow for automatically disabling the cap-installing driving connection in response to movement of the shell 14 in a cap-removing direction. Thus, both the cap-installing and cap-removing driving connections are uni-directional.

A preferred closure and pressure-vacuum vent valve assembly are described in U.S. Pat. No. 4,676,390 to Harris, the disclosure of which is incorporated herein by reference. The closure 30 includes an externally threaded shank portion 34 having a plurality of circumferentially spaced internal ribs 36 for engaging the removal hub 26 and a pressure-vacuum valve housing 29 for accepting the pressure-vacuum vent valve assembly 28. A gasket 31 provides a seal between the closure 30 and the filler neck 12, as shown in FIGS. 2 and 4. A radially-outwardly extending flange 38 projects from the upper end of the closure 30.

Shell 14 includes a top surface 40 configured to provide a raised operating handle 42, and a side wall 44 depending from the peripheral edge of top surface 40. Shell 14 is hollow and defines a space for rotatably receiving the race 24. The interior surface 46 of the side wall 44 includes a plurality of teeth 48 for engaging a circumferential skirt 50 formed on the retainer 32.

The operating handle 42 provides a hand grip for a person to grip and rotate the fuel cap 10 manually and includes a center aperture 52 for exposing the keyway 19 of the lock cylinder 18. The operating handle 42 is hollow and includes a pair of side walls 54 extending along the length of the operating handle 42 and a cylindrical interior wall 56 extending downwardly below the top surface 40.

The uni-directional driving connections use different components of the fuel cap 10 to couple the shell 14 to the closure 30 for installing or removing the fuel cap 10. The cap-installing driving connection between the shell 14 and the closure 30 utilizes the operating handle 42 to rotate the drive hub 16 which engages the race 24 to drive the closure 30 in the cap-installing direction.

Figure 7:
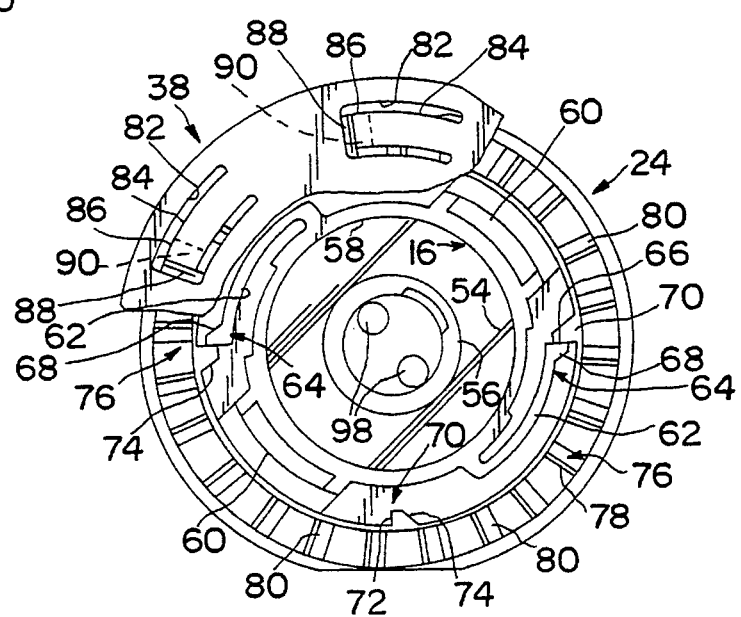
FIG. 7 is a partially broken away bottom view showing the interaction between the drive hub, the race, and the closure.

As best seen in FIGS. 1 and 7, the drive hub 16 includes an annular ring 58 and a pair of driven portions 60 extending upwardly therefrom. The driven portions 60 are sized and configured to fit between the side walls 54 of the operating handle 42 and be driven thereby. The inner diameter of the annular ring 58 is substantially equal to the outer diameter of the removal hub 26, and is configured to rotate about the removal hub 26 without interference. Thus, the drive hub 16 is free to rotate with the shell 14 without establishing a driving connection between the shell 14 and the removal hub 26.

As shown in FIG. 7, a pair of flexible arms 62 depend from the radially-outward surface of the annular ring 58 and extend generally parallel thereto. The flexible arms 62 include engaging end portions 64 having a flat drive surface 66 and a camming surface 68 formed at an acute angle to the drive surface 66. The engaging end portions 64 are configured to engage the race 24.

A preferred race is fully described in the Harris '390 patent. The race 24, shown in FIG. 7, includes a plurality of driven lugs 70 having an abrupt drive surface 72 and a cam surface 74 formed at an acute angle to the drive surface 72. Driven lugs 70 are positioned to engage or cam on the engaging end portions 64 of the flexible arms 62, depending on the direction of rotation of the shell 14. For example, when the shell 14 is rotated in the cap-installing direction, the drive surfaces 66 of the flexible arms 62 engage the drive surfaces 72 of the driven lugs 70 to drive the race 24 in the cap-installing direction. On the other hand, when the shell 14 is rotated in the cap-removing direction, the flexible arms 62 bend to allow the camming surfaces 68 of the drive hub 16 to ramp against the cam surfaces 74 of the driven lugs 70.

The camming action between the camming surfaces 68 and cam surfaces 74 disables the cap-installing driving connection when the shell 14 is rotated in the cap-removing direction. Thus, the components used in the cap-installing driving connection cannot be used to remove the fuel cap 10 from the filler neck 12, necessitating the establishment of a separate cap-removing driving connection.

The interaction between the race 24 and the closure 30 is also fully described in the Harris '390 patent and shown in FIG. 7. Generally, the race 24 includes a set of peripherally spaced-apart downwardly-facing triangular engaging members 76 which are positioned to engage the closure 30. The triangular engaging members 76 include a downwardly extending abrupt surface 78 and a camming surface 80 formed at an acute angle to the abrupt surface 78.

The flange 38 formed on the closure 30 includes a plurality of circumferentially spaced, generally rectangular apertures 82. A flexible arm 84 extends into each aperture 82 from a clockwise-most edge of the aperture 82 (as viewed in FIG. 7). The flexible arm 84 includes an upwardly extending engaging end portion 86 for engaging the triangular engaging members 76 formed on the race 24. The engaging end portions 86 include an upwardly extending abrupt surface 88 and a camming surface 90 formed at an acute angle to the abrupt surface 88.

As the race 24 is urged in the cap-installing direction by the engagement of the drive hub 16 and the lugs 70, the camming surfaces 80 of the triangular engaging members 76 engage the camming surfaces 90 of the engaging end portions 86, driving the closure 30 in the cap-installing direction. The resiliency of the flexible arms 84 sustains the driving engagement between the triangular engaging members 76 and the engaging end portions 86 until the gasket 31 properly seats against the lip 92 of the filler neck 12. When the gasket 31 is properly seated, the closure 30 stops rotating relative to the filler neck 12.

Once the closure 30 stops rotating relative to the filler neck 12, continued rotation of the shell 14 relative to the closure 30 actuates the torque-override feature. As the shell 14 continues to rotate relative to the closure 30, the triangular engaging members 76 apply an ever increasing downward force against the flexible arm 84. The flexible arms 84 bend in response to the increased force, causing the camming surfaces 90 to ramp downwardly on the camming surfaces 80, thereby allowing the triangular engaging members 76 to move past the engaging end portions 86. Thus, the shell 14 can continue to rotate in a cap-installing direction while the closure 30 remains stationary, advantageously preventing the fuel cap 10 from being installed too tightly on the filler neck 12.

Different components are used to establish the cap-removing driving connection between the shell 14 and the closure 30. The cap-removing driving connection uses the operating handle 42 to rotate the lock cylinder housing 20 and the lock cylinder 18 mounted therein. The lock cylinder housing 20, in turn, rotates the plunger 22. The lock cylinder 18, when turned by a key, as shown in FIG. 4 and to be described later, urges the plunger 22 into engagement with the removal hub 26 to drive the removal hub 26 in the cap-removing direction. The removal hub 26 is coupled to the closure 30, thereby completing the cap-removing driving connection between the shell 14 and the closure 30.

Lock cylinder 18 is a conventional lock having a keyway 19 (FIGS. 3 and 5), a plurality of plate segments 94, a retaining plate 96, and a pair of throw members 98. An enlarged diameter portion 100 is formed at the top of the lock cylinder 18, defining a shoulder 102 for positioning the lock cylinder 18 in the lock cylinder housing 20.

Lock cylinder housing 20 includes an annular collar 104 defining a cylindrical bore 106 therein for receiving the lock cylinder 18. A pair of downwardly and radially outwardly-projecting shoulders 108 extend from the bottom edge of the annular collar 104. A pair of engagement tabs 110 extends upwardly from the annular collar 104, with the tabs 110 being circumferentially offset from the shoulders 108 by 90°. A pawl 112 is formed on each engagement tab 110. The pawls 112 are positioned to engage recesses 120 that are formed in the cylindrical interior wall 56 of the operating handle 42.

An axially extending channel 114 formed in the annular collar 104 for receiving lock plate segments 94 is aligned with one of the tabs 110. When the lock plate segments 94 are positioned in the channel 114 and the shoulder 102 abuts the top of the annular collar 104, the retaining plate 96 overlaps the bottom edge of the annular collar 104. Thus the shoulder 102 and the retaining plate 96 cooperate to hold the lock cylinder 18 in the lock cylinder housing 20, as shown in FIGS. 2 and 4. Insertion of a key 116 (FIG. 4) into the keyway 19 withdraws the lock plate segments 94 into the lock cylinder 18 in a conventional fashion to allow the lock cylinder 18 to rotate inside the lock cylinder housing 20.

The cylindrical interior wall 56 defines a cylindrical chamber 118 having an inside diameter substantially equal to the outside diameter of the annular collar 104 and an outside diameter equal to the separation between the side walls 54 of the operating handle 42. A pair of radially outwardly-projecting rails 122 extend axially along the radially-outward surface of the cylindrical interior wall 56 for engaging the plunger 22. The cylindrical interior wall 56 is formed to include diametrally opposed, axially extending recesses 120 for receiving the pawls 112. When the pawls 112 engage the recesses 120, the lock cylinder housing 20 is rigidly attached to the shell 14.

The plunger 22 includes a cup-shaped central hub portion 124, a two-part collar 126 having a pair of arcuate portions 128 displaced radially outwardly from, and extending upwardly from, the central hub portion 124. A neck 130 extends downwardly from the central hub portion 124 for engaging the pressure-vacuum vent valve assembly 28.

A pair of parallel, spaced-apart rails 132 extend upwardly from the central hub portion 124 and have a wall 133 disposed therebetween. The rails 132 are positioned to fit between and abut the rails 122 formed on the cylindrical interior wall 56 of the operating handle 42. Thus the rails 132 of the plunger 22 engage the rails 122 so that the plunger 22 rotates with the operating handle 42 and the lock cylinder housing 20. Because the rails 122 and 132 overlap in the axial direction, the plunger 22 can move axially relative to the operating handle 42 and lock cylinder housing 20 while remaining rotationally locked thereto.

A pair of diametrally opposed fingers 134 extend upwardly from the central hub portion 124. Each finger 134 includes an engaging end portion 136 for engaging one of the shoulders 108 formed on the lock cylinder housing 20 and a resilient middle portion 138. When the fingers 134 are engaged with the shoulders 108, the shoulders 108 and the lower portion of the annular collar 104 are positioned in the plunger 22 between the fingers 134, as shown in FIG. 2.

Figure 6:
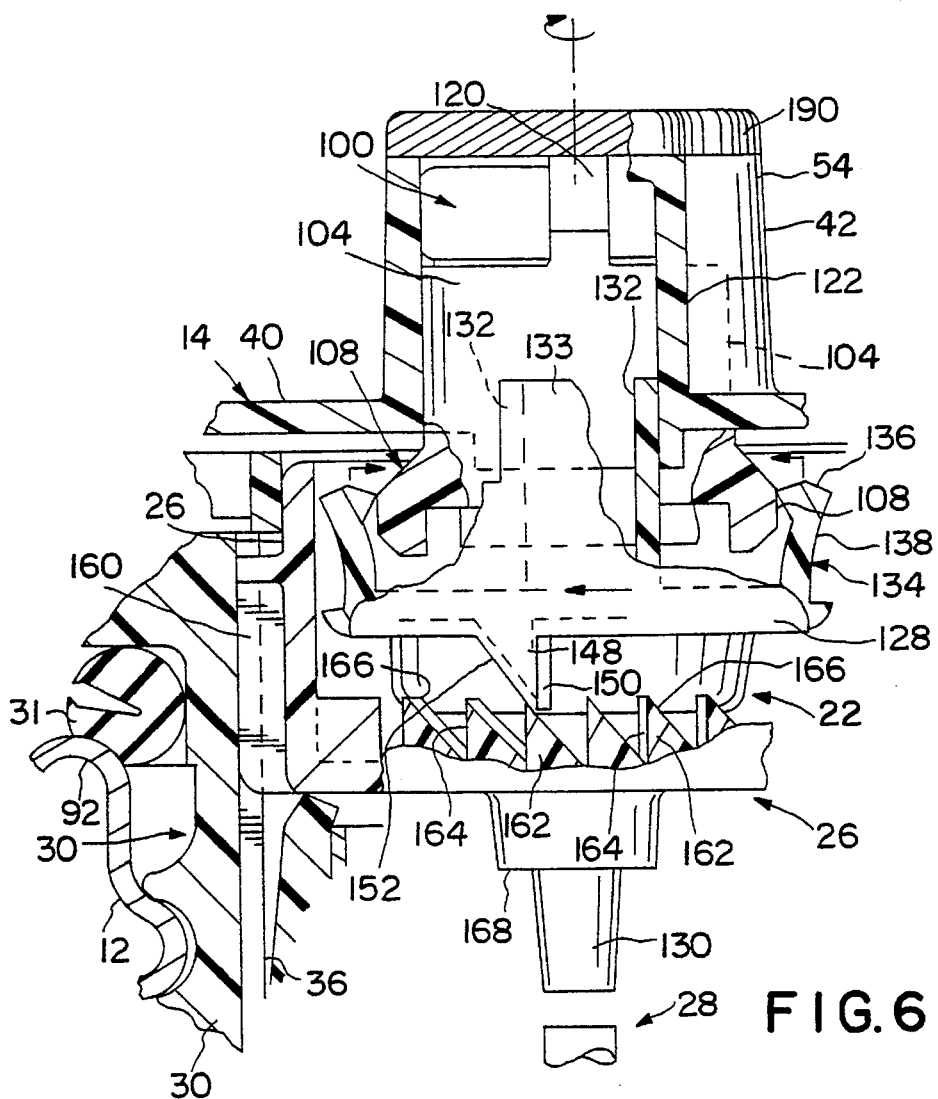
FIG. 6 is a partially broken away, enlarged view showing the relationship between the plunger, removal hub, and lock cylinder housing.

As best seen in FIG. 6, a pair of diametrally opposed drive teeth 148 are formed to extend downwardly from the arcuate portions 128 of the central hub portion 124 to engage the removal hub 16. A drive surface 150 of each tooth 148 extends downwardly from an arcuate portion 128 and a disengaging surface 152 intersects the drive surface 150 at an acute angle.

Returning to FIG. 1, the plunger 22 further includes a pair of arcuate, helical ramp surfaces 140 extending upwardly from the bottom 142 of the central hub portion 124 to terminate at a flat surface 144 adjacent a stop 146. The stop 146 extends upwardly beyond the flat surface 144 to form a mechanical stop.

The removal hub 26 includes a bottom wall 154 having a central aperture 156 and a cylindrical side wall 158 extending upwardly from the bottom wall 154. A pair of inverted U-shaped ridges 160 extend radially outwardly from the outer surface 184 of the cylindrical side wall 158. The ridges 160 are sized to fit between, and engage, the internal ribs 36 formed in the shank portion 34 of the closure 30 to rotationally lock the removal hub 26 to the closure 30.

A plurality of drive teeth 162 project upwardly from the bottom wall 154 adjacent the inner surface of the cylindrical side wall 158. The drive teeth 162 include a vertical drive surface 164 and a disengaging surface 166 intersecting the drive surface 164 at an acute angle. The drive teeth 162 are substantially identical to drive teeth 148 formed on the plunger 22, but inverted and positioned to engage the drive teeth 148. The drive surfaces 150, 164 and the disengaging surfaces 152, 166 of teeth 148, 162, respectively, are aligned in parallel relation to each other. Inserting a key 116 into the lock cylinder 18 retracts the lock plate segments 94 into the lock cylinder 18 to allow the lock cylinder 18 to rotate within the lock cylinder housing 20. Rotating the lock cylinder 18 inside the lock cylinder housing 20 causes the throw members 98 to rotate relative to the plunger 22. The throw members 98 cam on the helical ramp surfaces 140 until they abut the stop 146. As the throw members 98 cam on the ramp surfaces 140, the plunger 22 moves downwardly and the resilient middle portions 138 of the fingers 134 flex radially outwardly. As the fingers 134 flex, the engaging end portions 136 move around the shoulders 108, as best seen in FIG. 6. The fingers 134 are thus disengaged from the shoulders 108. At the same time, the shoulders 108 and annular collar 104 are positioned upwardly from the plunger 22, as shown in FIG. 4. Thus, the rotation of a key 116 to an unlocked position moves the plunger 22 downwardly, while the fingers 134 cooperate with the shoulders 108 to retain the plunger 22 in the downward position.

When the plunger, 22 is pushed downwardly by the camming action of the throw members 98 against the ramp surfaces 140, the drive teeth 148 are pushed into engagement with the drive teeth 162. The drive surfaces 150, 164 are oriented to engage each other in the cap-removing direction. Thus, the plunger 22 engages the removal hub 26 for rotation of the closure 30 in the cap-removing direction, and the cap-removing driving connection is thereby established.

By way of comparison, the disengaging surfaces 152, 166 engage each other during rotation of the plunger 22 in the cap-installing direction relative to the removal hub 26. If the key 116 has been returned to the locked position to disengage the throw members 98 from the ramp surfaces 140, such relative movement between the plunger 22 and the removal hub 26 causes the disengaging surfaces 152, 166 to ramp against each other. The ramping action moves the plunger 22 upwardly relative to the removal hub 26 and out of engagement with the removal hub 26, thereby disabling the cap-removing driving connection.

The pressure-vacuum vent value assembly 28 is actuated at the same time that the cap-removing driving connection is established. An annular skirt 168 depends from the bottom wall 154 and extends downwardly therefrom to form a neck passage 170 for receiving the neck 130 formed on the plunger 22. The skirt 168 serves to maintain the axial orientation of the neck 130 while permitting the neck 130 to extend through the bottom wall 154 of the removal hub 26 to engage the pressure-vacuum vent valve assembly 28. When the plunger 22 is pushed downwardly to establish a driving connection between the shell 14 and the closure 30, the neck 130 of the plunger 22 simultaneously engages the pressure-vacuum vent valve assembly 28, as shown in FIG. 4, to vent fuel pressure to atmosphere without the need to actually move the fuel cap 10 in the cap-removing direction.

As previously described, the uni-directional cap-removing driving connection can be disabled by rotating the plunger 22 relative to the removal hub 26. As the plunger 22 rotates relative to the removal hub 26, the parallel disengaging surfaces 152, 166 formed on the drive teeth 148, 162 ramp against each other, pushing the plunger 22 upwardly. During the upward movement of the plunger 22, the fingers 134 are pushed against the shoulders 108, bending the resilient middle portions 138. The fingers 134 move around and engage the shoulders 108 to hold the plunger 22 in the position shown in FIG. 2. Thus, the disengaging surfaces 152, 166 ramp against each other to disable the cap-removing driving connection and the fingers 134 engage the shoulders 108 to maintain the plunger 22 in the disabled position. The upward movement of the plunger 22 also deactivates the pressure-vacuum vent valve assembly 28.

The fuel cap 10 can be assembled by positioning the pressure-vacuum vent valve assembly 28 in the pressure-vacuum valve housing 29 in the closure 30. The removal hub 26 is positioned in the closure 30 above the pressure-vacuum vent valve assembly 28, with the inverted U-shaped ridges 160 positioned between the internal ribs 36.

The lock cylinder 18 is positioned in the lock cylinder housing 20, which, in turn, is positioned in the cylindrical interior wall 56 of the operating handle 42 so that the pawls 112 engage the recesses 120 to lock the lock cylinder housing 20 in position. The plunger 22 is coupled to the lock cylinder housing 20 so that the plunger rails 132 engage the rails 122 formed on the cylindrical interior wall 56 and the fingers 134 engage the shoulders 108 to hold the plunger 22 in position axially relative to the lock cylinder housing 20.

To complete assembly of the fuel cap 10, the retainer 32 is positioned adjacent the bottom surface of the flange 38, the race is positioned on the top surface of the flange 38, and the drive hub 16 is positioned to rest on the inverted U-shaped ridges 160 of the removal hub 26. The shell 14 is lowered over the closure 30 so that the side walls 54 of the operating handle 42 engage the driven portions 60 of the drive hub 16 and the side walls 44 extend downwardly to enclose the flange 38 and the retainer 32. The teeth 48 formed on the side walls 44 engage the retainer 32 to hold the assembled fuel cap 10 together.

The locked configuration of a lockable pressure relief fuel cap 10 is shown in FIG. 2. The threaded shank portion 34 engages complementary threads formed in the filler neck 12. The O-ring gasket 31 is positioned between the upper lip 92 of the filler neck and the closure 30 to form a primary seal between the fuel cap 10 and the filler neck 12. The plate segments 94 are extended from the lock cylinder 18 to engage the channel 114 to prevent rotational movement between the lock cylinder 18 and the lock cylinder housing 20. The fingers 134 formed on the plunger 22 are engaged with the shoulders 108 formed on the lock cylinder housing 20, holding the plunger 22 in position. While the fingers 134 are engaged with the shoulders 108, as shown in FIG. 2, the neck 130 is axially spaced-apart from the pressure-vacuum vent valve assembly 28, and the drive teeth 148, 162 are axially separated. Thus, the vent valve assembly 28 is positioned to maintain a differential pressure between the tank (not shown) and the atmosphere. At the same time, the cap-removing driving connection is disabled.

The unlocked configuration of a lockable pressure relief fuel cap 10 is shown in FIG. 4. The separate cap-removing driving connection is established simultaneously with actuation of the pressure-vacuum vent valve assembly 28. A key 116 is inserted into the lock cylinder 18, thereby withdrawing the lock plate segments 94 into the lock cylinder 18 and allowing the lock cylinder 18 to be rotated 90° to the unlocked position. As the lock cylinder 18 rotates, the throw members 98 cam against the arcuate, helical ramp surfaces 140 formed in the plunger 22, thereby pushing the plunger 22 downwardly. As the plunger 22 moves downwardly, the fingers 134 flex radially outwardly (FIG. 6) to disengage from the shoulders 108 formed on the lock cylinder housing 20. At the same time, drive teeth 148 formed on the plunger 22 engage the drive teeth 162 formed in the removal hub 26 (FIG. 6) and the neck 130 extends axially through the aperture 156 formed in the removal hub 26 to engage the pressure-vacuum vent valve assembly 28, allowing the fuel vapor pressure in the filler neck 12 to equalize with the atmosphere. Thus, merely turning the key 116 to the unlocked position without turning the shell 14 moves the plunger 22 to establish a unidirectional cap-removing driving connection between the shell 14 and the closure 30, and opens the pressure-vacuum vent valve assembly 28 to vent the tank (not shown).

Due to the engagement of the rails 132 formed on the plunger 22 with the rails 122 formed on the handle 42, the plunger 22 rotates with the shell 14. Rotation of the plunger 22 in turn rotates the removal hub 26. The inverted U-shaped ridges 160 engage the internal ribs 36 to rotationally lock the removal hub 26 to the closure 30. Thus, the shell 14, plunger 22, removal hub 26, and the internal ribs 36 formed in the closure 30 cooperate to define a driving connection between the shell 14 and the closure 30 for movement of the fuel cap 10 and the cap-removing direction.

Figure 3:
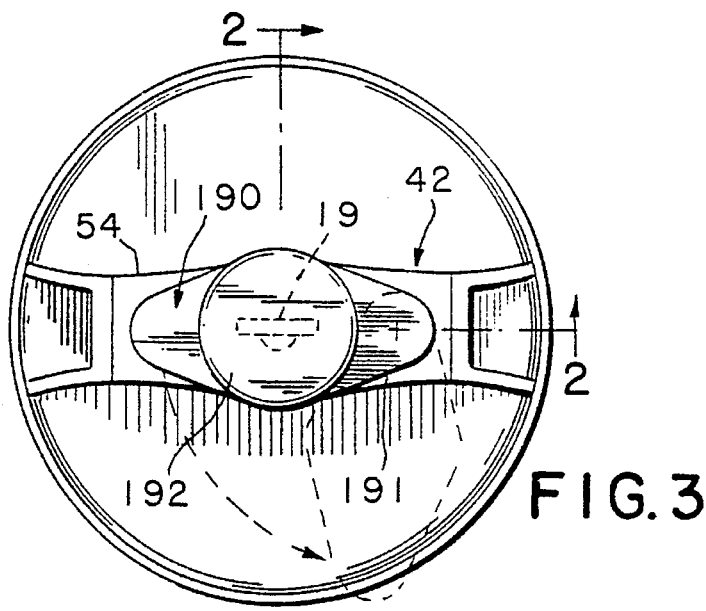
FIG. 3 is a plan view of the fuel cap showing the keyway in the locked position corresponding to the sectional view of FIG. 2.

Once the cap-removing driving connection is established, the key 116 can be rotated to the locked position, as shown in FIGS. 2–3 without disabling the driving connection. As seen in FIG. 4, the fingers 134 assume a driving connection-maintaining position relative to the shoulders 108. Thus, even though the throw members 98 are moved out of engagement with the ramp surfaces 140, the plunger 22 remains in an engaging position relative to the removal hub 26.

To install the fuel cap 10 in the filler neck 12, the threaded shank portion 34 is inserted into the filler neck 12 and rotated in the cap-installing direction until the O-ring gasket 31 seats against the upper lip 92 of the filler neck 12. During rotation of the shell 14 in the cap-installing direction, the driven lugs 70 of the race 24 engage and receive motion-inducing torque from the drive surfaces 66 of the drive hub 16, thereby establishing a driving connection between the shell 14 and the race 24. The camming surfaces 74 of the triangular engaging members 76 formed on the race 24 engage the camming surfaces 90 of the flexible arms 84 formed on the closure 30, rotating the closure 30 with the race 24. The race 24 thereby drives the closure 30, establishing a driving connection between the shell 14 and the closure 30 for movement in the cap-installing direction. The closure 30 will continue to rotate in a cap-installing direction until the O-ring gasket 31 properly seats against the lip 92 of the filler neck 12.

When a predetermined amount of contact between the O-ring gasket 31 and the filler neck 12 is achieved, the flexible arms 84 bend downwardly to allow the camming surfaces 74 and 90 to ramp past each other, providing a torque override feature to prevent the cap 10 from being installed too tightly. Thus, the closure 30 and removal hub 26 stop rotating relative to the filler neck while the shell 14 and plunger 22 continue to rotate relative to the filler neck 12.

From this position, the shell 14 can be further rotated in a cap-installing direction. The driven portions 60 of the drive hub 16 are positioned in the operating handle 42 and are rotated with the shell 14. The engaging end portions 64 of the drive hub 16 engage the lugs 70 formed on the race 24 to turn the race 24 with the shell 14. When the fuel cap 10 has been tightened on the filler neck to a predetermined amount, the peripherally extending arms 84 formed in the flange 38 flex downwardly, allowing the camming surfaces 80 formed on the race 24 to ramp against the camming surfaces 90 formed on the arms 84. This ramping action provides a torque override feature to prevent the fuel cap 10 from being installed too tightly on the filler neck 12. In preferred embodiments, the torque-override feature provides an audible "click" each time the camming surfaces 80 ramp on the camming surfaces 90.

It will be appreciated that if the lock cylinder 18 is kept in the unlocked position, the cap-removing driving connection will be maintained and the torque-override feature will not function. The lock cylinder 18 must be returned to the locked position to permit the shell 14 to be rotated relative to the closure 30 to disestablish the cap-removing driving connection. Moreover, the shell 14 must be rotated relative to the closure 30 far enough to cause the disengaging surfaces 152, 166 to ramp against each other and urge the plunger 22 upwardly until the fingers 134 engage the shoulders 108. Generally, three clicks from the torque-override feature signal adequate relative movement between the plunger 22 and the removal hub 26 to disable the cap-removing driving connection.

It will also be appreciated that, with the fuel cap 10 removed from the filler neck 12 and the lock cylinder 18 in the locked position, the cap-removing driving connection can be disabled by grasping the shank portion 34 with one hand while rotating the shell 14 with the other hand until the disengaging surfaces 152, 166 ramp against each other to move the plunger 22 out of engagement with the removal hub 26. In the event that the cap-removing drive connection is disabled while the fuel cap 10 is removed from the filler neck 12, the fuel cap 10 can nevertheless be inserted to the filler neck to close the tank (not shown). The cap-installing driving connection and the torque-override feature are totally independent of the cap-removing driving connection. Thus, the fuel cap 10 can still be installed on the filler neck 12 to provide a seal between the closure 30 and the filler neck 12.

Figure 8:
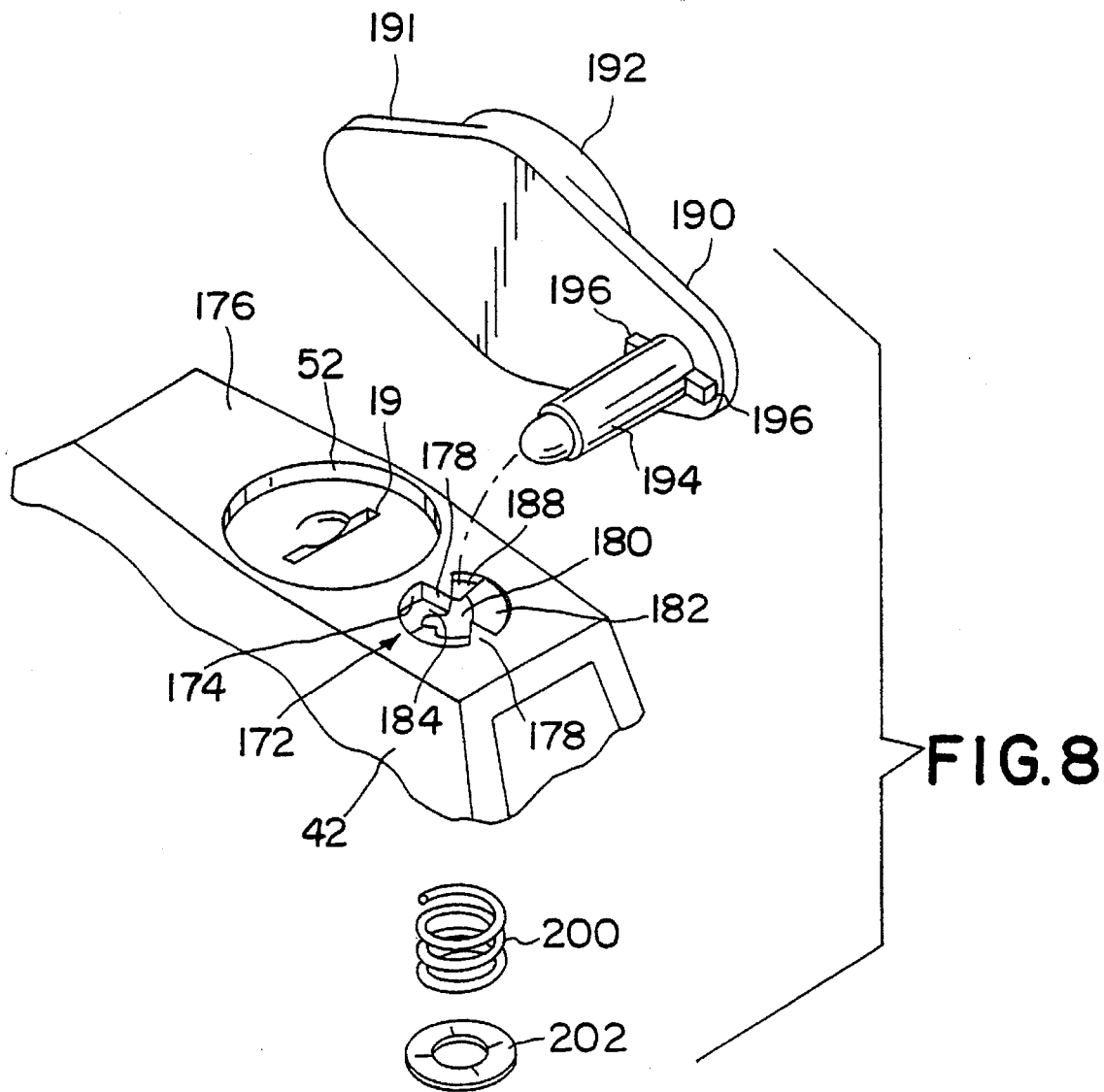
FIG. 8 is an exploded perspective view of the lock cylinder cover assembly.

An annular recess 172 (FIG. 8) having an outer wall 174 is formed in the top surface 176 of the operating handle 42 adjacent the aperture 52. As shown in FIG. 8, a pair of triangular stop tabs 178 extend radially inwardly from the outer wall 174 of the recess 172 to a post-receiving aperture 180 centered in the recess 172. A pair of arcuate helical ramp surfaces 182 extend axially between the bottom 184 of the recess 172 and the top surface 176 of the operating handle 42, and radially between the post-receiving aperture 180 to the outer wall 174 of the recess 172. A pair of trapezoidal-shaped camming lug-receiving detents 188 are positioned between the triangular stop tabs 178 and the arcuate ramp surfaces 182.

A lock cover 190 is rotatably coupled to the operating handle 42 for rotatable movement between a lock-exposing position (shown in FIG. 5) and a lock-covering position (shown in FIG. 3). The lock cover 190 includes a generally diamond-shaped cover plate 191 having a raised circular center portion 192. A post 194 depends downwardly from the cover plate 191. A pair of opposed, rectangular camming lugs 196 extend radially outwardly from the post 194 and abut the cover plate 191.

The lock cover 190 is positioned on the operating handle 42 with the lock cover post 194 positioned in the post-receiving aperture 180. When the cover plate 191 is in the lock cylinder-covering position, shown in solid lines FIG. 8, the camming lugs 196 are seated adjacent the bottom surface 184 of the recess 172 and adjacent the triangular stop tabs 178. When the lock cover post 194 is inserted into the post-receiving aperture 180, a compression spring 200 is installed on the cover post 194 from inside the operating handle 42, and a lock washer 202 engages the post 194 to hold the spring 200 in position.

Figure 5:
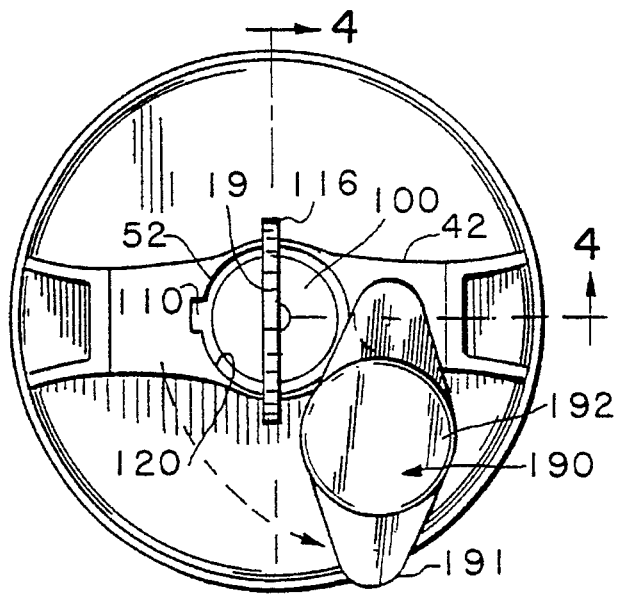
FIG. 5 is a plan view of the fuel cap showing the keyway in the unlocked position corresponding to the view of FIG. 4.

Rotation of the cover plate 191 in a counter clockwise direction ramps the camming lugs 196 against the helical ramp surfaces 182, lifting the cover plate 191 against the force of the compressed spring 200. After approximately 90° of counterclockwise rotation, the camming lugs 196 enter the detents 188. The force from the compressed spring 200 urges the lugs 196 into the detents 188 and holds the cover plate 191 in the lock cylinder exposing position, as shown in FIG. 5.

To move the cover plate 191 from the lock cylinder-exposing to the lock cylinder-covering position, the cover plate 191 is lifted out of the detents 188 and rotated clockwise, allowing the camming lugs 196 to move down the arcuate ramp surfaces 182 as the cover plate 191 moves clockwise. The compressed spring 200 pulls the camming lugs 196 along the ramp surfaces 182, rotating the cover plate 191 in a clockwise direction to the lock cylinder-covering position, shown in FIG. 3.

Although the invention has been described in detail with reference to a certain preferred embodiment, variations and modifications exist within the scope and spirit of the invention as described and defined in the following claims.

I claim:

1. A lockable fuel cap for closing a filler neck of a fuel tank, the cap comprising closure means for threadably engaging and closing the filler neck, the closure means being movable relative to the filler neck between a removed position and an installed position, shell means for providing a hand grip to permit manual rotation of the closure means about an axis of rotation, vent means for equalizing fuel vapor pressure between the filler neck and the atmosphere, lock means coupled to the shell means and movable from a locked position to an unlocked position to establish a cap-removing driving connection between the shell means and the closure means for movement of the closure means in the cap-removing direction, and means for actuating the vent means in response to movement of the lock means from the locked position to the unlocked position, the actuating means being supported for reciprocating movement along the axis of rotation during movement of the lock means between the locked position and the unlocked position.

2. The cap of claim 1, wherein the lock means includes a cam and the actuating means includes a plunger and a cam follower positioned on the plunger to engage the cam and move the plunger along the axis of rotation during movement of the lock means to the unlocked position.

3. The cap of claim 2, wherein the lock means includes a lock mechanism and a throw member coupled to the lock mechanism and configured to define the cam.

4. The cap of claim 2, wherein the cam follower is an annular ramp positioned to wind around the axis of rotation.

5. The cap of claim 4, wherein the lock means further includes a lock mechanism formed to include a keyway and a key-actuated throw member, the key-actuated throw member is configured to define the cam, and the key-actuated throw member is coupled to the lock mechanism to rotate relative to the lock mechanism in response to turning a key in the keyway to urge the cam defined by the throw member against the cam follower to move the plunger as the throw member rotates relative to the lock mechanism.

6. The cap of claim 1, wherein the actuating means includes an elongated neck positioned to lie in the closure means and to move along the axis of rotation of the closure means in response to movement of the lock means to the unlocked position.

7. The cap of claim 6, wherein the vent means includes a vacuum-relief valve and the elongated neck is moved along the axis of rotation to engage the vacuum-relief valve in response to movement of the lock means to the unlocked position.

8. The cap of claim 1, wherein the closure means is formed to include an interior region and the lock means includes a lock mechanism and a throw member coupled to the lock mechanism and positioned to extend into the interior region of the closure means.

9. The cap of claim 8, wherein the actuating means includes a plunger having an annular ramp positioned to wind around the axis of rotation and to engage the throw member during movement of the lock means to the unlocked position and a neck positioned to move along the axis of rotation during movement of the lock means to the unlocked position and the throw member is positioned to cam the annular ramp to move the neck along the axis of rotation to engage and actuate the vent means in response to movement of the lock means to the unlocked position.

10. A lockable fuel cap for closing a filler neck of a fuel tank, the cap comprising closure means for engaging and closing the filler neck, the closure means being movable relative to the filler neck between a removed position and an installed position, shell means for providing a hand grip to permit manual rotation of the closure means, vent means for equalizing fuel vapor pressure between the filler neck and the atmosphere, lock means coupled to the shell means and movable from a locked position to an unlocked position to establish a cap-removing driving connection between the shell means and the closure means for movement of the closure means in the cap-removing direction, means for actuating the vent means in response to movement of the lock means from the locked position to the unlocked position, race means for engaging the closure member, and drive hub means coupled to the shell means for engaging the race means to provide a cap-installing driving connection between the shell means and the closure means for movement of the closure means in a cap-installing direction, the drive hub means further including means for disengaging the cap-installing driving connection in response to movement of the shell means in a cap-removing direction.

11. A lockable fuel cap for closing a filler neck of a fuel tank, the cap comprising closure means for engaging and closing the filler neck, the closure means being movable relative to the filler neck between a removed position and an installed position, shell means for providing a hand grip to permit manual rotation of the closure means, vent means for equalizing fuel vapor pressure between the filler neck and the atmosphere, lock means coupled to the shell means and movable from a locked position to an unlocked position to establish a cap-removing driving connection between the shell means and the closure means for movement of the closure means in the cap-removing direction, and means for actuating the vent means in response to movement of the lock means from the locked position to the unlocked position, the lock means including a cam, the actuating means including plunger means for actuating the vent means, and the plunger means having cam follower means for urging the plunger means to a vent means-actuating position in response to movement of the cam during movement of the lock means to the unlocked position.

12. The cap of claim 11, further comprising removal hub means for engaging the closure means, and wherein the plunger means further includes means for engaging the removal hub means to establish the cap-removing driving connection.

13. The cap of claim 11, further comprising lock cylinder housing means for coupling the lock means to the shell means, and wherein the plunger means includes finger means for engaging the lock cylinder housing means and the finger means is movable from an engaging position to a driving connection-maintaining position.

14. The cap of claim 13, wherein the finger means is movable from the engaging position to the driving connection-maintaining position in response to movement of the lock means to the unlocked position.

15. The cap of claim 13, wherein the finger means is movable from the driving connection-maintaining position to the engaging position in response to movement of the shell means relative to the closure means in a cap-installing direction.

16. A lockable fuel cap for closing a filler neck of a fuel tank, the cap comprising closure means for threadably rotatably engaging and closing the filler neck, the closure means being movable relative to the filler neck between a removed position and an installed position, shell means for providing a hand grip to permit manual rotation of the closure means, lock means coupled to the shell means and movable between a locked position and an unlocked position for selectively locking and unlocking the fuel cap, vent means for equalizing fuel vapor pressure between the filler neck and the atmosphere, and coupling means for providing a cap-removing driving connection between the shell means and the closure means in response to movement of the lock means from the locked position to the unlocked position for movement of the closure means in a cap-removing direction, the coupling means including plunger means for actuating the vent means in response to movement of the lock means to the unlocked position.

17. The cap of claim 16, wherein the coupling means further includes removal hub means for engaging the closure means and the plunger means includes engagement means for drivingly connecting the plunger means to the removal hub means in response to the movement of the lock means to the unlocked position.

18. The cap of claim 17, wherein the engagement means includes a plurality of first drive teeth formed on the plunger means, the removal hub means includes a plurality of second drive teeth, and the plunger means and the removal hub means are positioned to orient the first drive teeth in complementary relationship with the second drive teeth to establish the cap-removing driving connection between the closure means and the shell means.

19. The cap of claim 17, wherein the plunger means includes means for disabling the cap-removing driving connection in response to movement of the shell means relative to the closure means in a cap-installing direction.

20. The cap of claim 19, wherein the disabling means includes first ramping surfaces formed on the plunger means and second ramping surfaces formed on the removal hub means, and the first and second ramping surfaces are complementary to each other and configured to ramp against each other in response to movement of the shell means relative to the closure means in the cap-installing direction.

21. The cap of claim 16, wherein the coupling means further includes a removal hub rotationally coupled to the closure means, the plunger means actuating the vent means and engaging the removal hub means to rotationally lock the shell means to the closure means for rotation of the closure means in a cap-removing direction.

22. The cap of claim 21, wherein the actuating and engaging occur simultaneously in response to movement of the lock means from the locked position to the unlocked position.

23. The cap of claim 16, wherein the lock means includes a cam and the plunger means includes a cam follower positioned to engage the cam during movement of the lock means to the unlocked position.

24. The cap of claim 23, wherein the lock means includes a lock mechanism and a throw member coupled to the lock mechanism and configured to define the cam.

25. The cap of claim 23, wherein the cam follower is an annular ramp.

26. The cap of claim 23, wherein the lock means further includes a lock mechanism formed to include a keyway and a key-actuated throw member, the key-actuated throw member is configured to define the cam, and the key-actuated throw member is coupled to the lock mechanism to rotate relative to the lock mechanism in response to turning a key in the keyway to urge the cam defined by the throw member against the cam follower to move the plunger means as the throw member rotates relative to the lock mechanism.

27. The cap of claim 16, wherein the closure means is rotatable about an axis of rotation and the plunger means includes a neck positioned to move along the axis of rotation of the closure means in response to movement of the lock means to the unlocked position.

28. The cap of claim 27, wherein the vent means includes a vacuum-relief valve and the neck is moved along the axis of rotation to engage the vacuum-relief valve in response to movement of the lock means to the unlocked position.

29. A lockable fuel cap for closing a filler neck of a fuel tank, the cap comprising closure means rotatably engaging and closing the filler neck, the closure means being movable relative to the filler neck between a removed position and an installed position, shell means for providing a hand grip to permit manual rotation of the closure means, lock means coupled to the shell means for selectively locking and unlocking the fuel cap, the lock means being movable between a locked position and an unlocked position, coupling means for establishing a cap-removing driving connection between the shell means and the closure means in response to movement of the lock means to the unlocked position for movement of the closure means in a cap-removing direction, and uncoupling means for automatically disabling the cap-removing driving connection in response to movement of the shell means relative to the closure means in the cap-installing direction when the lock means is in the locked position.

30. The cap of claim 29, further comprising vent means for equalizing fuel vapor pressure between the filler neck and the atmosphere through the closure means, and wherein the coupling means includes means for opening the vent means in response to movement of the lock means to the unlocked position.

31. The cap of claim 30, wherein the uncoupling means includes means for moving the opening means from a vent means-opening position to a vent means-closing position in response to movement of the shell means relative to the closure means in the cap-installing direction.

32. The cap of claim 30, wherein the lock means includes a cam and the opening means includes a cam follower positioned to engage the cam during movement of the lock means to the unlocked position.

33. The cap of claim 32, wherein the lock means further includes a lock mechanism and a throw member coupled to the lock mechanism and configured to define the cam.

34. The cap of claim 30, wherein the closure means is rotatable about an axis of rotation and the plunger means includes a neck positioned to move along the axis of rotation of the closure means in response to movement of the lock means to the unlocked position.

35. The cap of claim 34 wherein the vent means includes a vacuum-relief valve and the neck is moved along the axis of rotation to engage the vacuum-relief valve in response to movement of the lock means to the unlocked position.

36. The cap of claim 29, wherein the coupling means includes a plunger having finger means movable between an engaged position and a driving connection-maintaining position, the finger means moving to the driving connection-maintaining position in response to movement of the lock means to the unlocked position and moving to the engaged position in response to movement of the shell means relative to the closure means in the cap-installing direction.

37. The cap of claim 29, wherein the coupling means includes a plunger rotationally locked to the shell means and a removal hub rotationally locked to the closure.

38. A lockable fuel cap for closing a filler neck of a fuel tank, the cap comprising closure means for engaging and closing the filler neck, the closure means being movable relative to the filler neck between a removed position and an installed position, shell means for providing a hand grip to permit manual rotation of the closure member, lock means coupled to the shell means for selectively locking and unlocking the fuel cap, removal hub means for engaging the closure member, and plunger means for engaging the removal hub means; the lock means, removable hub means, and plunger means cooperating to establish a cap-removing driving connection between the shell means and the closure means in response to movement of the lock means to the unlocked position for movement of the closure means in a cap-removing direction.

39. The cap of claim 38, wherein the plunger means includes means for automatically disengaging the cap-removing driving connection in response to movement of the shell means relative to the closure means in a cap-installing direction.

40. The cap of claim 39, wherein the plunger means is rotationally locked to the shell means and the removal hub means is rotationally locked to the closure means and the plunger means includes ramp means for engaging the lock means to drive the plunger means into engagement with the removal hub means in response to movement of the lock means to the unlocked position.

41. A lockable fuel cap for closing a filler neck of a fuel tank, the cap comprising closure means for rotatably engaging and closing the filler neck, the closure means being movable relative to the filler neck between a removed position and an installed position, shell means for providing a hand grip to permit manual rotation of the closure member, lock means coupled to the shell means and movable between a locked position and an unlocked position for selectively locking and unlocking the fuel cap, first means for providing a uni-directional cap-installing driving connection between the shell means and the closure means, the cap-installing driving connection being bypassed in response to movement of the shell means relative to the closure means in the cap-removing direction, and second means for providing a uni-directional cap-removing driving connection between the shell means and the closure means in response to movement of the lock means to the unlocked position, the cap-removing driving connection being disabled by movement of the shell means relative to the closure means in the cap-installing direction when the lock means is in the locked position.

42. A lockable fuel cap for closing a filler neck of a fuel tank, the cap comprising closure means for rotatably engaging and closing the filler neck, the closure means being movable relative to the filler neck between a removed position and an installed position, shell means for providing a hand grip to permit manual rotation of the closure means, lock means coupled to the shell means and movable between a locked position and an unlocked position for selectively locking and unlocking the fuel cap, vent means for equalizing fuel vapor pressure between the filler neck and the atmosphere, and coupling means for providing a cap-removing driving connection between the shell means and the closure means in response to movement of the lock means from the locked position to the unlocked position for movement of the closure means in a cap-removing direction, the coupling means including plunger means for actuating the vent means in response to movement of the lock means to the unlocked position wherein the coupling means further includes removal hub means for engaging the closure means and the plunger means includes engagement means for drivingly connecting the plunger means to the removal hub means in response to the movement of the lock means to the unlocked position.

43. A lockable fuel cap for closing a filler neck of a fuel tank, the cap comprising closure means for rotatably engaging and closing the filler neck, the closure means being movable relative to the filler neck between a removed position and an installed position, shell means for providing a hand grip to permit manual rotation of the closure means, lock means coupled to the shell means and movable between a locked position and an unlocked position for selectively locking and unlocking the fuel cap, vent means for equalizing fuel vapor pressure between the filler neck and the atmosphere, and coupling means for providing a cap-removing driving connection between the shell means and the closure means in response to movement of the lock means from the locked position to the unlocked position for movement of the closure means in a cap-removing direction, the coupling means including plunger means for actuating the vent means in response to movement of the lock means to the unlocked position wherein the coupling means further includes a removal hub rotationally coupled to the closure means, the plunger means actuating the vent means and engaging the removal hub means to rotationally lock the shell means to the closure means for rotation of the closure means in a cap-removing direction.

* * * * *